June 30, 1942.  W. ASTLE  2,287,958
HEAT EXCHANGE APPARATUS
Original Filed Aug. 27, 1937    6 Sheets-Sheet 1

Inventor:
William Astle
By Ames, Miaz, Olson & Mecklenburger
Attys

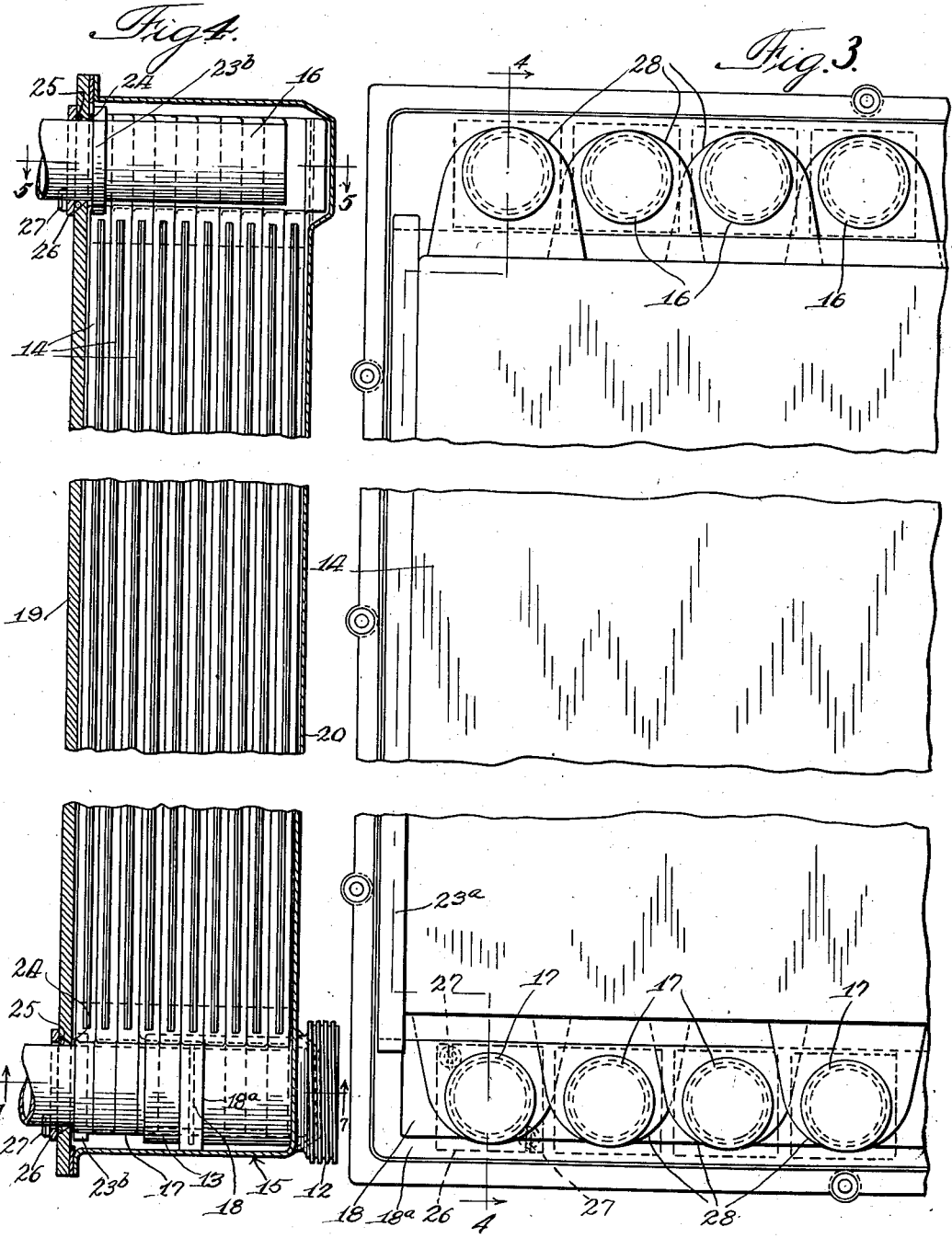

June 30, 1942.   W. ASTLE   2,287,958
HEAT EXCHANGE APPARATUS
Original Filed Aug. 27, 1937   6 Sheets-Sheet 4
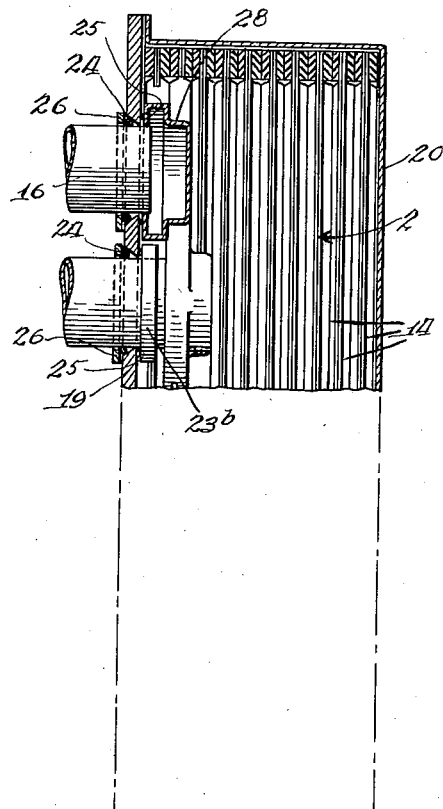
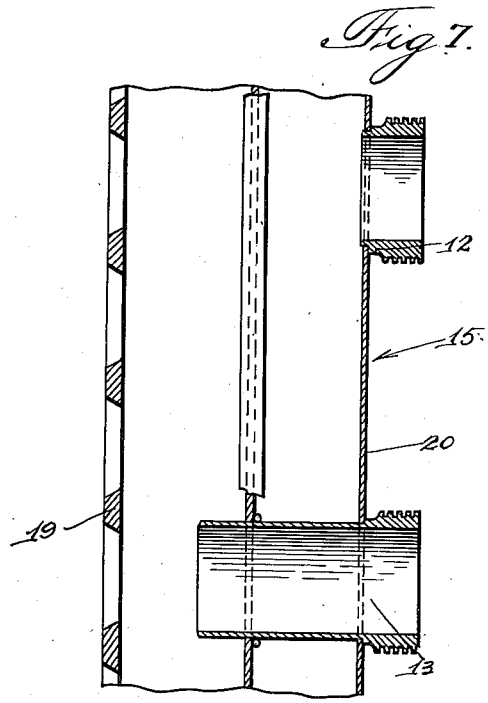
Fig. 7.
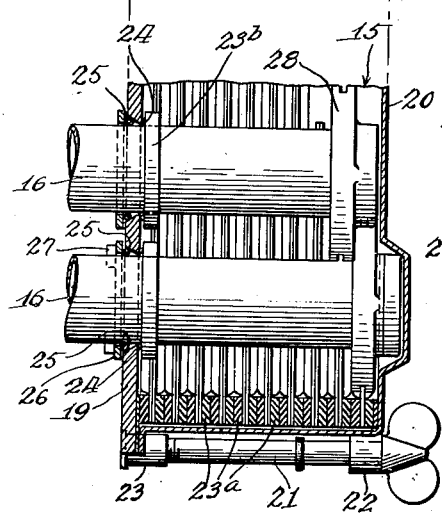
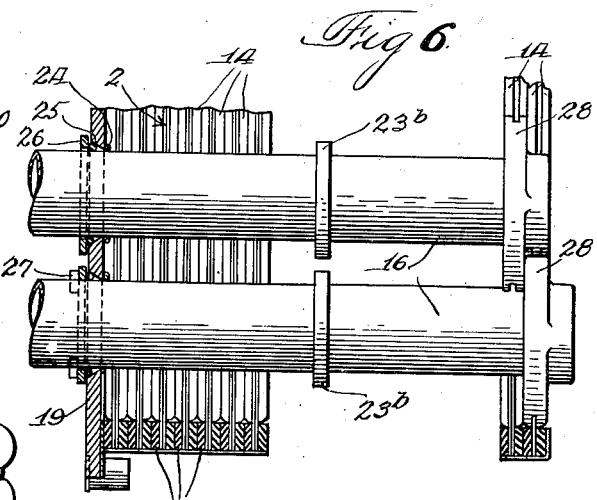
Fig. 6.
Fig. 5.
Inventor.
William Astle.
By Amos, Thiess, Olson & Mecklenburger
Attys.

June 30, 1942. W. ASTLE 2,287,958
HEAT EXCHANGE APPARATUS
Original Filed Aug. 27, 1937 6 Sheets-Sheet 5
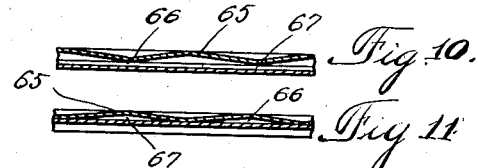
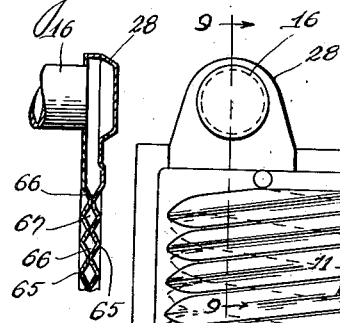
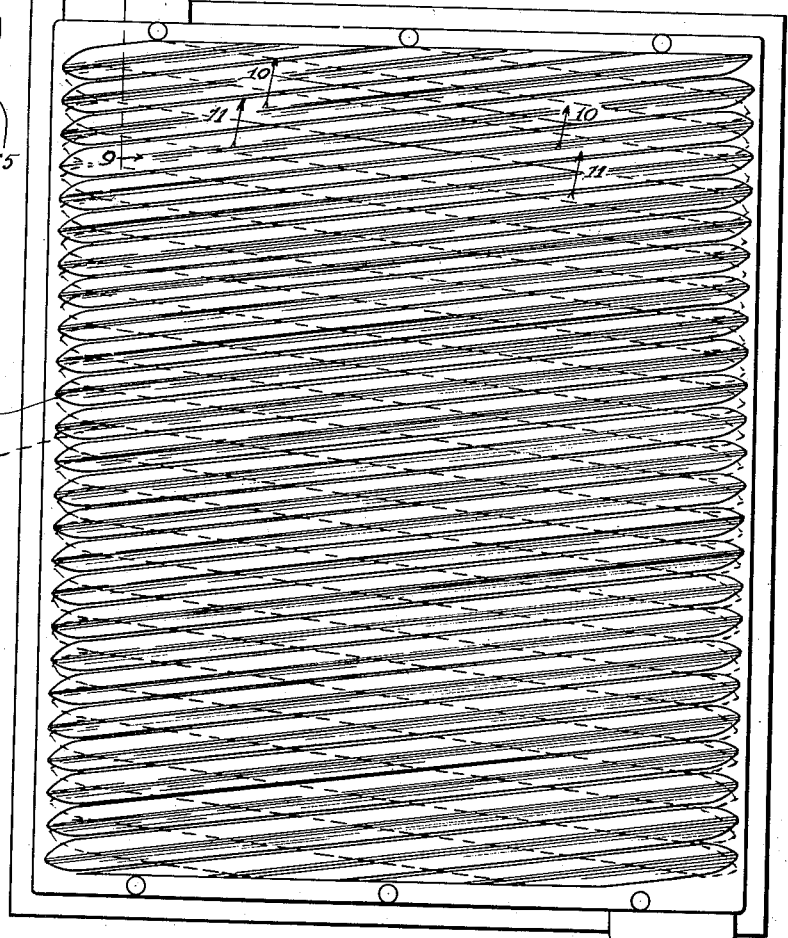

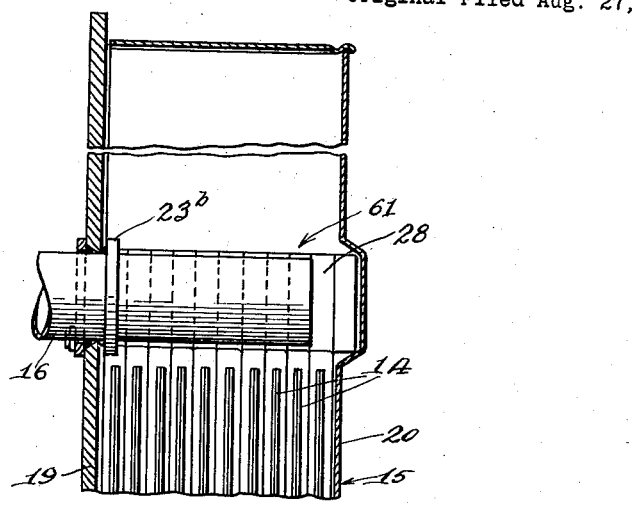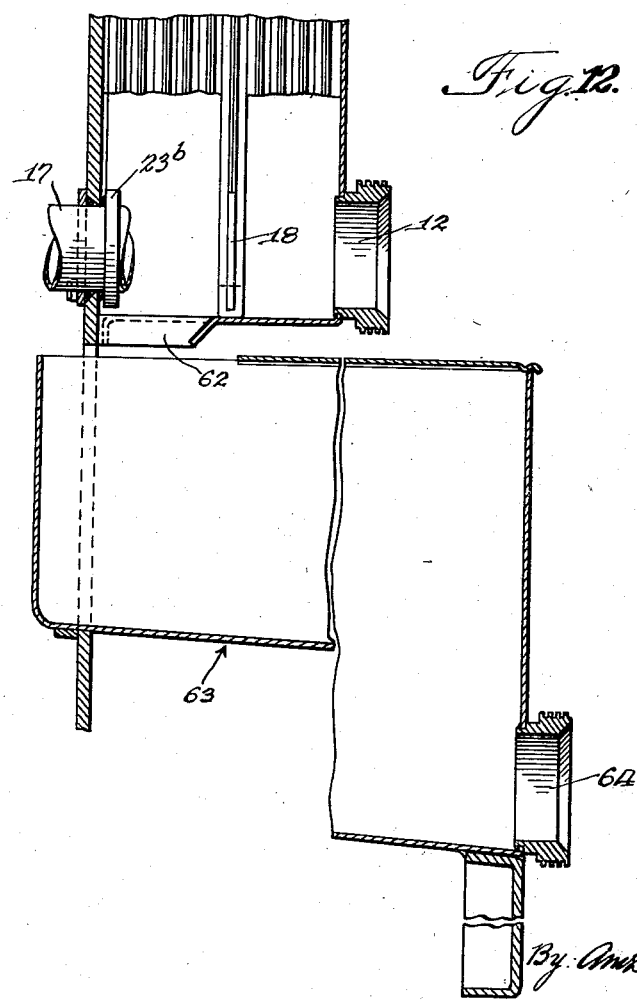
Fig. 12.

Patented June 30, 1942

2,287,958

UNITED STATES PATENT OFFICE 2,287,958

HEAT EXCHANGE APPARATUS

William Astle, Chicago, Ill.

Original application August 27, 1937, Serial No. 161,265. Divided and this application August 26, 1940, Serial No. 354,276

7 Claims. (Cl. 257—245)

My invention relates to heat exchange apparatus.

This application is a division of my co-pending application Serial No. 161,265, filed August 27, 1937.

One of the objects of my invention is to provide an improved plate heat exchange apparatus which will enable the cleaning of the heat exchange plates.

Further objects and advantages of the invention will be apparent from the description and claims.

In the drawings, in which several embodiments of my invention are shown,

Fig. 3 is an elevational view showing the ammonia cooling cells;

Fig. 4 is a section on the line 4—4 of Fig. 3;

Fig. 5 is a horizontal sectional view on the line 5—5 of Fig. 4;

Fig. 6 is a section on the line 5—5 of Fig. 4 with the cover removed and some of the plates separated;

Fig. 7 is a section on the line 7—7 of Fig. 4;

Fig. 8 is a plan view of one of the ammonia plates;

Fig. 9 is a section on the line 9—9 of Fig. 8;

Fig. 10 is a section on the line 10—10 of Fig. 8;

Fig. 11 is a section on the line 11—11 of Fig. 8; and

Fig. 12 is a vertical sectional view showing a different form of ammonia cooling apparatus.

Figure 1:
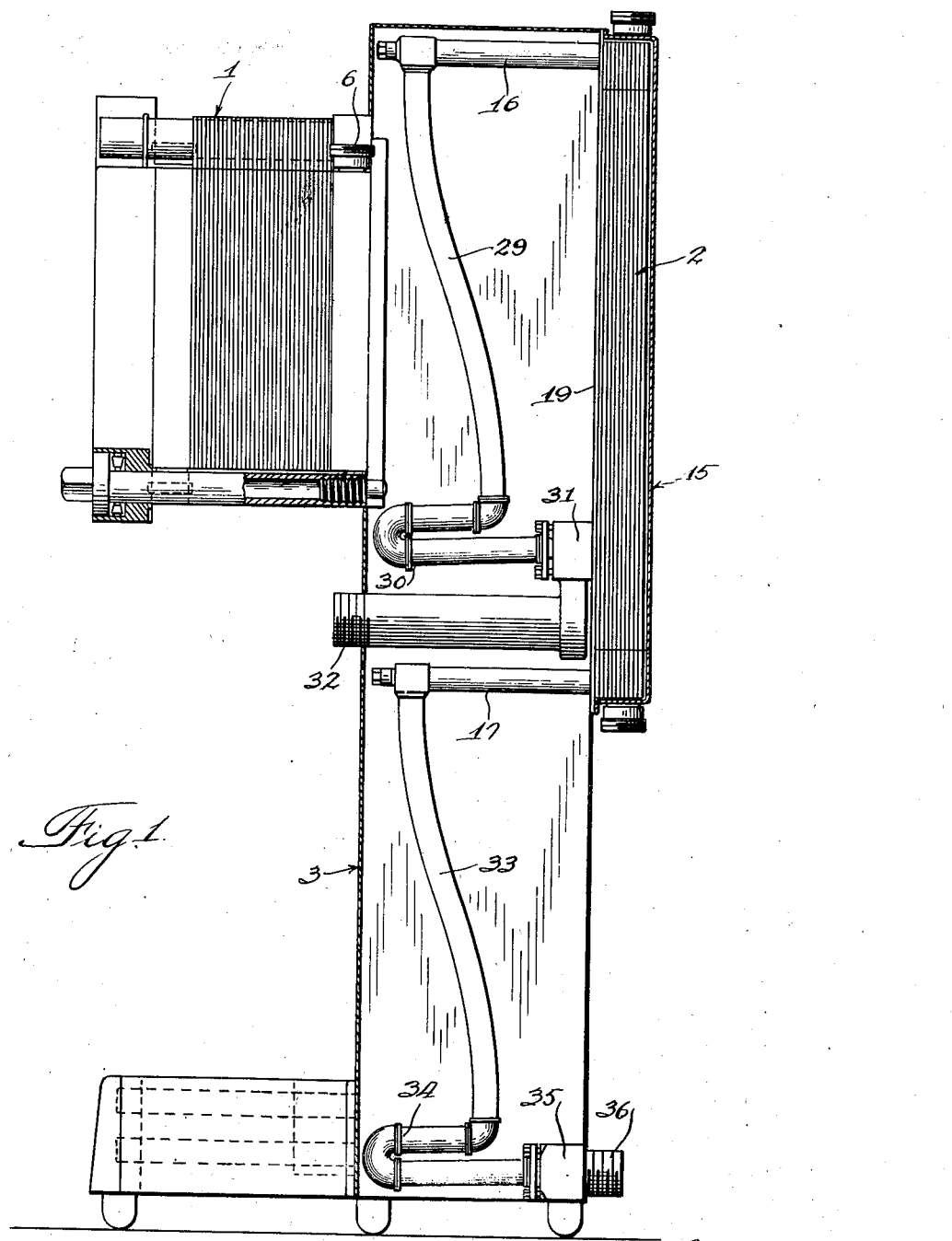
Figure 1 is a side elevational view of a heat exchange apparatus.

Referring to the drawings in detail, the construction shown comprises a regenerative set 1 of plates, which may be used for effecting a transfer of heat between warm milk from the holder and incoming raw milk, and a cooling set 2 of plates which may be used for the transfer of heat from the milk to be cooled coming from the regenerative set to ammonia flowing through the cooling set. Both sets of heat transfer plates may be mounted on a framework 3, the plates of both sets being separable for cleaning between the plates. The framework 3 includes a base portion provided with suitable supporting legs.

Raw milk may be supplied to the regenerative set of plates through either of the two nipples 4 and 5 and may be discharged from the regenerative set through either of the two nipples 6 and 7. The milk to be cooled coming from the holder may be supplied to the regenerative set through either of the two nipples 8 and 9 and may be discharged through either of the two nipples 10 and 11, from whence it is led to the entrance nipple 12 of the cooling set. The milk to be cooled flows through the cooling set and may be discharged through the discharge nipple 13. Those of the nipples 4 to 11 which are not being used may be closed in any suitable manner as by pipe caps.

The cooling set of plates comprises a plurality of thin flat cells 14 suitably corrugated, nested together and enclosed within a casing 15. Each individual cell of this set is provided with an inlet pipe 16 for the inlet of ammonia and with a discharge pipe 17 for the discharge of ammonia. The casing or tank 15 provides for the flow of milk to be cooled, the milk entering at the entrance nipple 12, flowing upwardly between the ammonia cells 14 on the right of a partition in the casing, thence transversely along the space above the ammonia cells, thence downwardly between the ammonia cells to the bottom of the casing and thence out through the discharge nipple 13.

To provide a complete partition for causing an upward flow of milk on one side of the partition and a downward flow on the other, a partition plate 18 (Figs. 3 and 4) is provided below the ammonia cells 14, which partition plate may be secured, as by spot welding or the like, to one of the ammonia cells. This partition is provided with a sealing strip or gasket 18a at its edge to effect a seal between the partition plate 18 and the adjacent wall of the tank 15.

Figure 2:
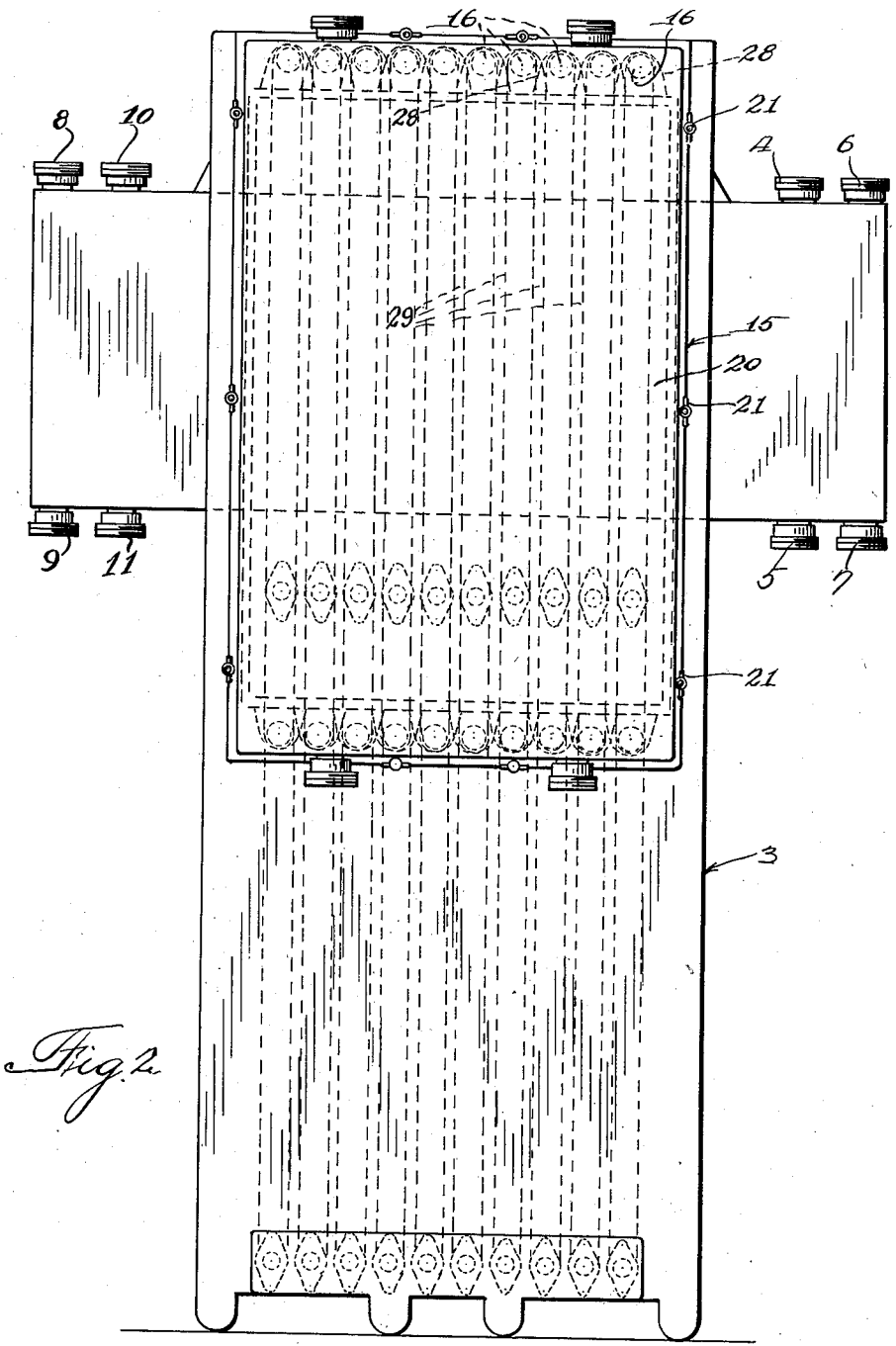
Fig. 2 is an elevational view from the right of Fig. 1.

In order to enable the ammonia cells to be separated for cleaning the outer surfaces of the cells, the supply and discharge pipes 16 and 17 for each ammonia cell are slidable in openings in a wall 19 of the milk containing casing 15. The dished cover portion 20 of the casing or tank is made removable in order to enable the separation of the ammonia cells for cleaning. This separable connection with the wall of the casing may be effected by means of screws 21 (Figs. 2 and 5) extending through openings in lugs 22 on the casing cover 20 and threaded into bushing 23 secured to the wall portion 19 of the casing. Where the pipes 16 and 17 pass through the thick wall 19 of the casing, suitable packing means are provided to prevent leakage to these points. In order to prevent leakage past the side edges of the ammonia cells 14, the vertical side edges may be provided with suitable gaskets 23a which engage the adjacent walls of the casing, as shown in Figs. 3, 5 and 6. In order properly to position the individual ammonia cells and insure tight packing at the place where they go through the thick wall of the casing, each inlet and outlet pipe is provided with an annular flange 23b which, when the cell is properly positioned for operation, will engage the gasket 24 to hold it snugly against the thick wall 19. In order to hold the outer gasket 25 in position, suitable gasket retaining plates 26 are provided which bear against the gasket 25 and are secured to the thick wall by means of screws 27.

The inlet and discharge pipes 16 and 17 for the ammonia cells are connected and placed in communication with the individual cells 14 by means of hollow connector members 28, the broad edges of which are in communication with the interior of the ammonia cells and the lateral faces of which are in communication either with the inlet or discharge pipes 16 or 17. Each of the inlet pipes 16 is in communication with a flexible supply conduit 29, which, in turn, is in communication with a U-shaped conduit 30 connected with the ammonia supply header 31, connected with the ammonia supply pipe 32, as shown in Fig. 1. Similarly, each of the individual ammonia discharge conduits 17 is in communication with a flexible conduit 33 leading to a U-shaped conduit 34 connected with the ammonia discharge header 35 and discharge pipe 36. The flexible conduits enable the sliding movement of the supply and horizontal discharge pipes which are connected with the individual ammonia cells.

To clean the ammonia cells, it is only necessary to drain the milk out of the casing 15, remove the cover-retaining screws 21 and cover 20 and then pull out the ammonia cells 14, one by one, and clean the outer surfaces of the ammonia cells which have been exposed to the milk.

Fig. 6 shows the first and second ammonia cells 14 pulled away from the others to allow cleaning between the second and third cells. When the exposed surfaces of the second and third cells have been cleaned, the third cell will be pulled out, enabling the exposed surfaces of the third and fourth cells to be cleaned, etc. After the exposed surfaces of the cells have been cleaned, the cells may be pushed back to assembled position and the cover 20 may be put in place and secured as before by means of the screws 21.

Figs. 8, 9, 10 and 11 show one manner in which the ammonia cells 14 may be corrugated. As shown, there are the corrugations 65 on one wall of the cell extending at an angle to the corrugations 65 of the opposite wall so that the fluid flowing downwardly within the cell will pass from restricted portions 66 to expanded portions 67 of the flow passage, causing turbulence in the flow and increasing the efficiency of the heat transfer plates.

Further modifications will be apparent to those skilled in the art and it is desired, therefore, that the invention be limited only by the prior art and the scope of the appended claims.

Having thus described my invention, what I claim and desire to secure by Letters Patent is:

1. A heat exchange apparatus for controlling the exchange of heat from one flowing fluid film to another comprising a plurality of thin flat juxtaposed cells, each providing a thin fluid film flow space, a casing in which said cells are placed, means for circulating a fluid within said casing and over the outer surfaces of said cells, rigid tubes extending through the wall of the casing and communicating with the interiors of said cells, respectively, to provide a circulation of fluid within the cells, and flexible tubes connected with said rigid tubes, said rigid tubes being movable longitudinally through openings in the wall of the casing whereby the cells may be separated for cleaning without disconnecting either the rigid or the flexible tubes.

2. A heat exchange apparatus for controlling the exchange of heat from one flowing fluid film to another comprising a plurality of thin flat juxtaposed cells, each providing a thin fluid film flow space, a casing in which said cells are placed, means for circulating a fluid within said casing and over the outer surfaces of said cells, and tubes extending through the wall of the casing and communicating with the interiors of said cells, respectively, to provide a circulation of fluid within the cells, said tubes being movable longitudinally through openings in the wall of the casing whereby the cells may be separated for cleaning without disconnecting the tubes, said tubes extending transversely with respect to the planes of the cells, the connections of the tubes with the cells being offset with respect to each other laterally of the cells to prevent interference between the respective tubes and connections.

3. A heat exchange apparatus for controlling the exchange of heat from one flowing fluid film to another comprising a plurality of thin flat juxtaposed cells each providing a thin fluid film flow space, a casing in which said cells are placed, means for circulating a fluid within said casing and over the outer surfaces of said cells, and tubes extending transversely with respect to the plane of said cells through the wall of the casing and communicating with the interiors of said cells, respectively, to provide a circulation of fluid within the cells, said tubes being movable longitudinally through openings in the wall of the casing whereby the cells may be separated for cleaning without disconnecting the tubes.

4. A heat exchange apparatus for controlling the exchange of heat from one flowing fluid film to another comprising a plurality of thin flat juxtaposed cells each providing a thin fluid film flow space, a casing in which said cells are placed, means for circulating a fluid within said casing and over the outer surfaces of said cells, and tubes extending through the wall of the casing and communicating with the interiors of said cells, respectively, to provide a circulation of fluid within the cells, said tubes being movable longitudinally through openings in the wall of the casing transversely with respect to the plane of said cells whereby the cells may be separated for cleaning without disconnecting the tubes, said casing having a removable portion which when removed affords access to said cells for cleaning.

5. In a heat exchange device, a casing, a plurality of plates of heat conducting material arranged in pairs, each pair of plates being secured together about the edges thereof and having spaced-apart portions forming a cell within which a fluid may be circulated, tubular means connected to said cells for circulating a fluid therewithin, said tubular means extending transversely of the plane of said plates, and fitting in and extending through openings in said casing and supporting said cells within said casing whereby said cells may be separated for cleaning, and means for circulating a second fluid within said casing and over the outer surfaces of said cells.

6. A heat exchange apparatus for controlling the exchange of heat from one flowing fluid film to another comprising a plurality of thin flat juxtaposed cells, each providing a thin fluid film flow space, a casing in which said cells are placed, means for circulating a fluid within said casing and over the outer surfaces of said cells, said cells lying in general in substantially vertical planes, said casing comprising a substantially vertical wall substantially parallel to the plane of said cells, and a removable cover surrounding and enclosing said cells, and rigid tubes extending through said vertical wall and communicating with the interiors of said cells, there being an inlet and an outlet tube for each cell, said tubes being movable longitudinally through openings in said wall whereby when the cover is removed the cells may be separated for cleaning.

7. A heat exchange apparatus for controlling the exchange of heat from one flowing fluid film to another comprising a plurality of thin flat juxtaposed cells, each providing a thin fluid film flow space, a casing in which said cells are placed, means for circulating a fluid within said casing and over the outer surfaces of said cells, said cells lying in general in substantially vertical planes, said casing comprising a substantially vertical wall and a removable cover surrounding and enclosing said cells, rigid tubes extending through said vertical wall and communicating with the interiors of said cells, there being an inlet and an outlet tube for each cell, said tubes being movable longitudinally through openings in said wall whereby when the cover is removed the cells may be separated for cleaning, and flexible tubes connected with said rigid tubes, respectively.

WILLIAM ASTLE.